United States Patent
Chen et al.

(10) Patent No.: US 12,257,752 B2
(45) Date of Patent: Mar. 25, 2025

(54) MULTI-MOLD BLOCK DRIVE DEVICE AND INJECTION MOLDING MACHINE HAVING THE MULTI-MOLD BLOCK DRIVE DEVICE

(71) Applicants: Cheng-Ho Chen, Changhua County (TW); Chih-Tsung Kuo, Taichung (TW)

(72) Inventors: Cheng-Ho Chen, Changhua County (TW); Chih-Tsung Kuo, Taichung (TW); Chuen-Cherng Yang, Taichung (TW)

(73) Assignees: Cheng-Ho Chen, Changhua County (TW); Chih-Tsung Kuo, Taichung (TW)

( * ) Notice: Subject to any disclaimer, the term of this patent is extended or adjusted under 35 U.S.C. 154(b) by 133 days.

(21) Appl. No.: 18/337,915

(22) Filed: Jun. 20, 2023

(65) Prior Publication Data
US 2023/0405894 A1    Dec. 21, 2023

(30) Foreign Application Priority Data
Jun. 21, 2022 (TW) .................................. 111123094

(51) Int. Cl.
*B29C 45/06* (2006.01)
*B29C 45/33* (2006.01)
*B29C 45/57* (2006.01)

(52) U.S. Cl.
CPC .......... *B29C 45/332* (2013.01); *B29C 45/572* (2013.01); *B29C 2045/575* (2013.01)

(58) Field of Classification Search
CPC ..... B29C 45/06; B29C 45/062; B29C 45/067; B29C 45/0678; B29C 45/1761;
(Continued)

(56) References Cited

U.S. PATENT DOCUMENTS 5,264,178 A * 11/1993 Yamamura .......... B29C 49/4205
425/531
5,589,205 A * 12/1996 Ishikawa ............. B29C 49/4205
425/534
(Continued)

FOREIGN PATENT DOCUMENTS

CN     202239570 U    5/2012
TW     M547433 U      8/2017

OTHER PUBLICATIONS

Search Report appended to an Office Action, which was issued to Taiwanese counterpart application No. 111123094 by the TIPO on Jun. 20, 2023, with an English translation thereof.

*Primary Examiner* — Thu Khanh T. Nguyen
(74) *Attorney, Agent, or Firm* — Muncy, Geissler, Olds & Lowe, P.C.

(57) ABSTRACT

A multi-mold block drive device includes a guide seat having a plurality of spaced-apart guide holes extending through inner and outer peripheral surfaces thereof, a plurality of speed reduction drive units each including a speed reducer driven by a servo motor and having an eccentric shaft, and a plurality of mold locking units each connected between one of the guide holes and a corresponding speed reduction drive unit. Each mold locking unit includes a pivot shaft, a linkage disposed between the pivot shaft and the corresponding guide hole, and a guide rod pivoted to the linkage. The linkage includes a crank driven by the eccentric shaft, a first link arm pivoted between the crank and the pivot shaft, and a second link arm pivoted between the crank and the guide rod. An injection molding machine having the multi-mold block drive device is also disclosed.

4 Claims, 9 Drawing Sheets

(58) Field of Classification Search
CPC ............ B29C 45/1762; B29C 45/1763; B29C 45/1764; B29C 45/1765; B29C 2045/1757; B29C 33/30; B29C 33/305; B29C 33/307; B29C 33/34; B29C 43/04; B29C 70/56
See application file for complete search history.

(56) References Cited

U.S. PATENT DOCUMENTS

| | | | |
|---|---|---|---|
| 2008/0174048 A1* | 7/2008 | Boyd ..................... | B29C 45/06 264/328.11 |
| 2015/0076735 A1* | 3/2015 | Moyer, II ............... | B29C 45/06 264/297.3 |
| 2021/0291417 A1* | 9/2021 | Yanahara ............ | B29C 45/1756 |

* cited by examiner

MULTI-MOLD BLOCK DRIVE DEVICE AND INJECTION MOLDING MACHINE HAVING THE MULTI-MOLD BLOCK DRIVE DEVICE

CROSS-REFERENCE TO RELATED APPLICATION

This application claims priority to Taiwanese Invention Patent Application No. 111123094, filed on Jun. 21, 2022.

FIELD

The disclosure relates to a multi-mold block drive device for positioning a mold and an injection molding machine having the multi-mold block drive device.

BACKGROUND

An existing multi-slider hybrid power mold guide device for a die casting machine, as disclosed in Chinese Patent Publication No. CN202239570U, includes a base support, a plurality of elbow linkage mechanisms, a plurality of molds, a plurality of pneumatic cylinders, and a plurality of hydraulic cylinders. Through movement of the shaft of each pneumatic cylinder in the direction of an axis thereof, each elbow linkage mechanism is driven by the shaft of the corresponding pneumatic cylinder to slidingly move the corresponding mold relative to the base support to achieve the opening or closing of the mold. An additional locking force is applied by the corresponding oil cylinder to the mold after the mold is closed.

Although the aforesaid multi-slider hybrid power guide mold device can achieve its intended purpose, there is room for improvement of the structure thereof.

SUMMARY

Therefore, an object of the present disclosure is to provide a multi-mold block drive device that has a simple structure.

According to this disclosure, the multi-mold block drive device includes a guide seat, a plurality of speed reduction drive units and a plurality of mold locking units. The guide seat includes an inner peripheral surface surrounding an axis and defining a mold hole, an outer peripheral surface opposite to the inner peripheral surface, and a plurality of spaced-apart guide holes surrounding the mold hole. Each guide hole extends through the inner and outer peripheral surfaces along a central line transverse to the axis and communicates with the mold hole. The speed reduction drive units are disposed spaced apart from the outer peripheral surface, are positioned relative to the guide seat, and correspond respectively to the guide holes. Each speed reduction drive unit includes a servo motor, and a speed reducer driven by the servo motor. The speed reducer has an eccentric shaft disposed eccentrically and capable of outputting rotational force.

Each mold locking unit is connected between one of the guide holes and a corresponding speed reduction drive unit. Each mold locking unit includes a pivot shaft that is fixed relative to the guide seat and that is located outwardly of a corresponding guide hole, a linkage disposed between the pivot shaft and the corresponding guide hole, and a guide rod pivoted to the linkage. The linkage includes a crank driven by the eccentric shaft, a first link arm pivoted between the crank and the pivot shaft, and a second link arm pivoted between the crank and the guide rod. When the linkage of each mold locking unit is driven by the corresponding speed reduction drive unit, the linkage will in turn drive the guide rod to move linearly along the central line.

Another object of the present disclosure is to provide an injection molding machine that has the multi-mold block drive device and that can alleviate at least one of the drawbacks of the prior art.

According to another aspect of this disclosure, the injection molding machine includes a machine base, a feeding unit, a material feed backflow prevention device, a multi-mold block drive device, and a pair of molds. The feeding unit is mounted on the machine base for feeding a linear material, and includes a plurality of pull wheel assemblies spaced apart from each other along an axis, and a motor for driving the pull wheel assemblies. The material feed backflow prevention device is mounted on the machine base and is located on a side of the feeding unit for preventing backflow of the linear material during feeding. The multi-mold block drive device is mounted on the machine base and is located at a material discharge end of the material feed backflow prevention device. The multi-mold block drive device is suitable for driving a plurality of mold blocks, and includes a guide seat, a plurality of drivers and a plurality of speed reductions units.

The guide seat includes an inner peripheral surface surrounding an axis and defining a mold hole, an outer peripheral surface opposite to the inner peripheral surface, a plurality of spaced-apart mold grooves formed in the inner peripheral surface and communicating with the mold hole, and a plurality of spaced-apart guide holes each of which extends through the outer peripheral surface along a central line transverse to the axis and communicates with a respective one of the mold grooves. The speed reduction drive units are disposed spaced apart from the outer peripheral surface, are positioned relative to the guide seat, and correspond respectively to the guide holes. Each speed reduction drive unit includes a servo motor, and a speed reducer driven by the servo motor. The speed reducer includes an eccentric shaft disposed eccentrically and capable of outputting rotational force.

Each mold locking unit is connected between one of the guide holes and a corresponding speed reduction drive unit. Each mold locking unit includes a pivot shaft that is fixed relative to the guide seat and that is located outwardly of a corresponding guide hole, a linkage pivoted to the pivot shaft, and a guide rod pivoted to the linkage. The linkage includes a crank driven by the eccentric shaft, a first link arm pivoted between the crank and the pivot shaft, and a second link arm pivoted between the crank and the guide rod. When the linkage of each mold locking unit is driven by the corresponding speed reduction drive unit, the linkage will in turn drive the guide rod to move linearly along the central line.

The pair of molds are disposed in two opposite ones of the mold grooves, are located at a material discharge end of the material feed backflow prevention device, and are capable of receiving a flowable raw material extruded from the material discharge end. The pair of molds are configured to be clamped and locked by the mold blocks when the mold blocks are driven by the multi-mold block drive device to move toward each other.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
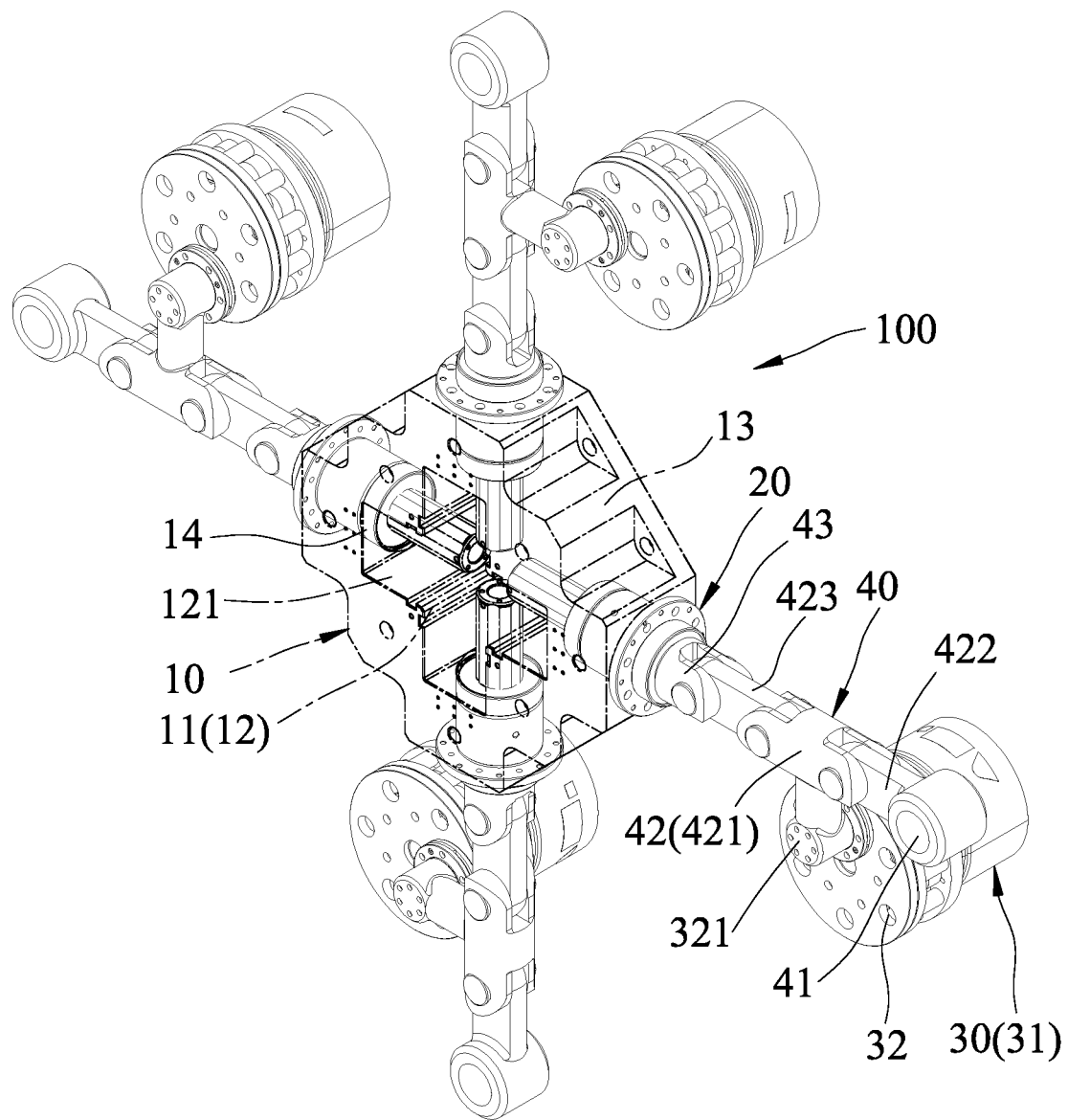
FIG. 1 is a perspective view of a multi-mold block drive device according to an embodiment of the present disclosure.

Referring to FIGS. 1 to 4 and 9, a multi-mold block drive device 100 according to an embodiment of the present disclosure is suitable for mounting on an injection molding machine 1, and is capable of driving a plurality of mold blocks 101 to lock a pair of molds 102. The multi-mold block drive device 100 includes a guide seat 10, a plurality of linear bearing units 20, a plurality of speed reduction drive units 30, and a plurality of mold locking units 40. The injection molding machine 1 is used for producing optical lenses, and includes a machine base 60, a feeding unit 70, a material feed backflow prevention device 80, the multi-mold block drive device 100, and the pair of molds 102.

Figure 2:
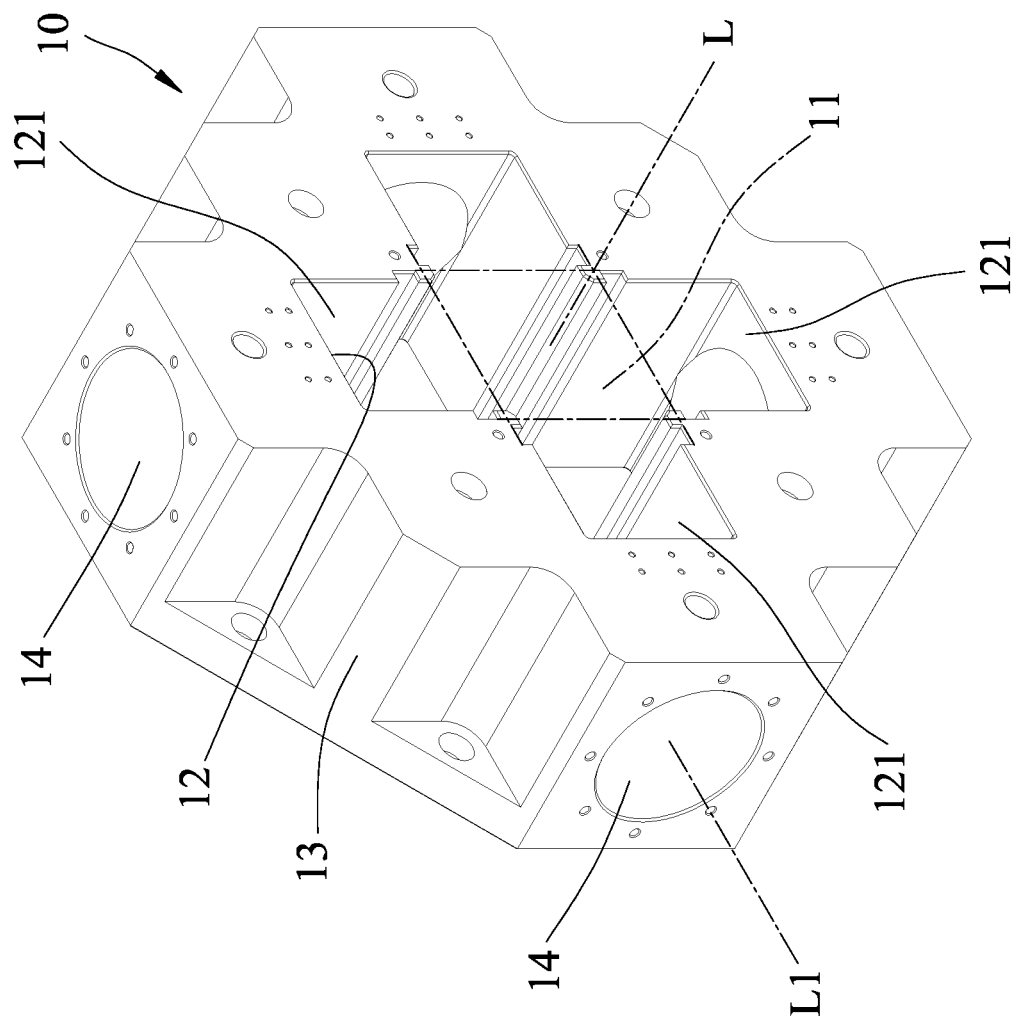
FIG. 2 is a perspective view of a guide seat of the multi-mold block drive device of the embodiment.

With reference to FIG. 2, the guide seat 10 includes an inner peripheral surface 12, an outer peripheral surface 13 opposite to the inner peripheral surface 12, and a plurality of guide holes 14. The inner peripheral surface 12 surrounds an axis (L) and defines a mold hole 11. The inner peripheral surface 12 has a cross-sectional shape perpendicular to the axis (L) that is cross-shape, and has four mold grooves 121 that extend inwardly therefrom, that are spaced apart from each other by an angle of 90 degrees, and that surround and communicate with the mold hole 11. In this embodiment, there are four guide holes 14 each radially extending through the outer peripheral surface 13 along a central line (L1) transverse to the axis (L) and communicating with a respective one of the mold grooves 121.

Figure 3:
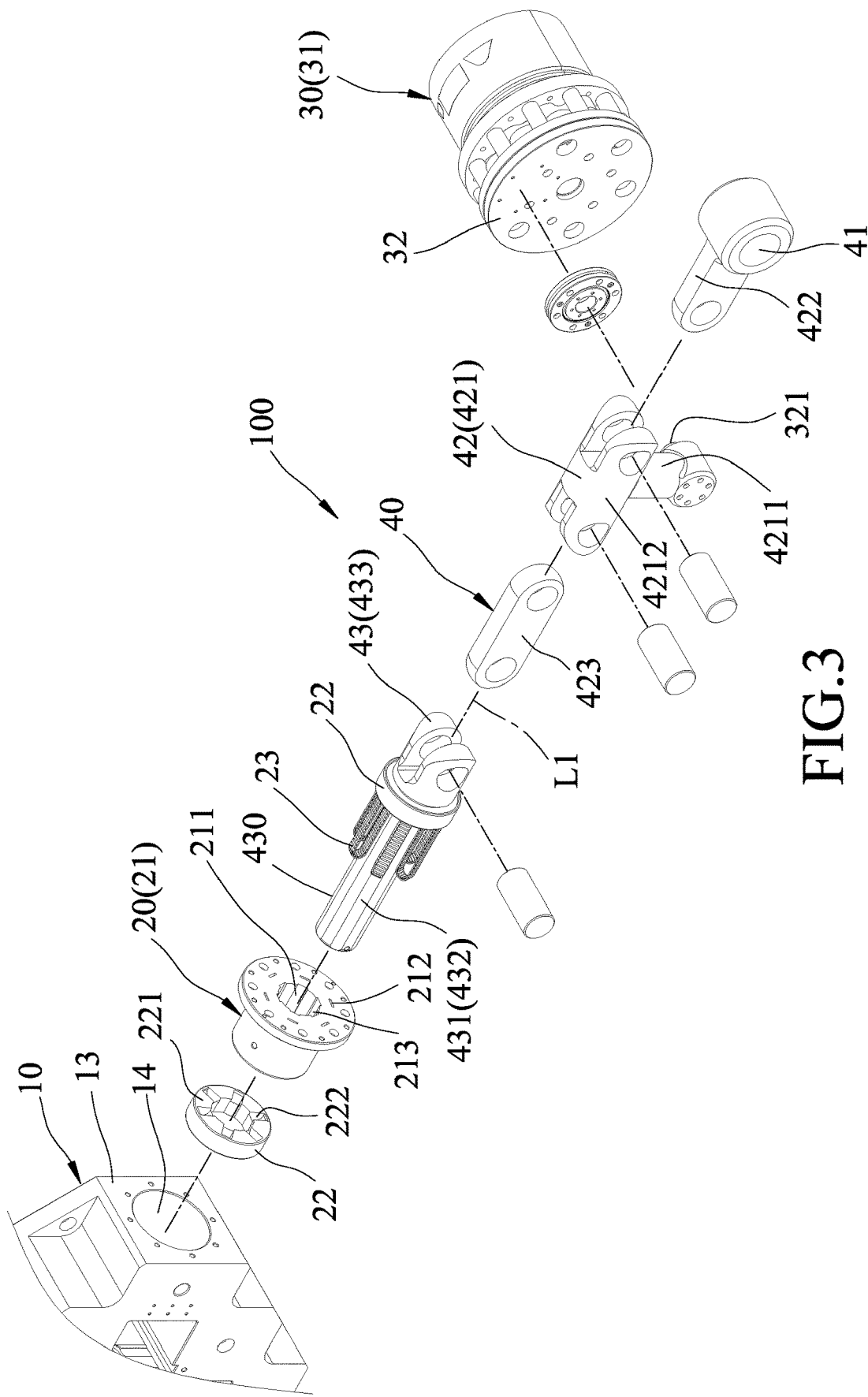
FIG. 3 is an exploded perspective view of a portion of FIG. 1.
Figure 4:
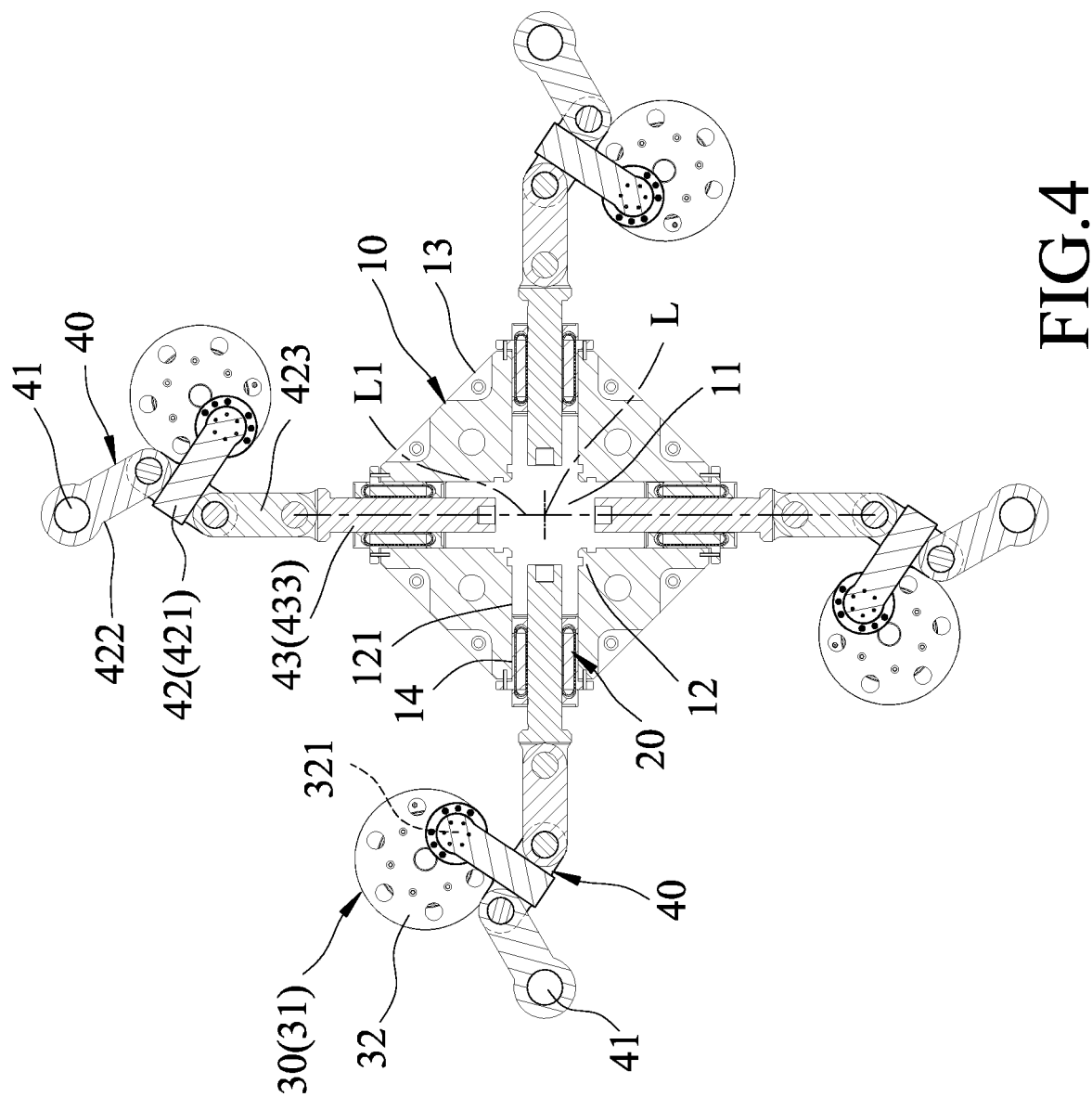
FIG. 4 is a sectional view of the embodiment.
Figure 5:
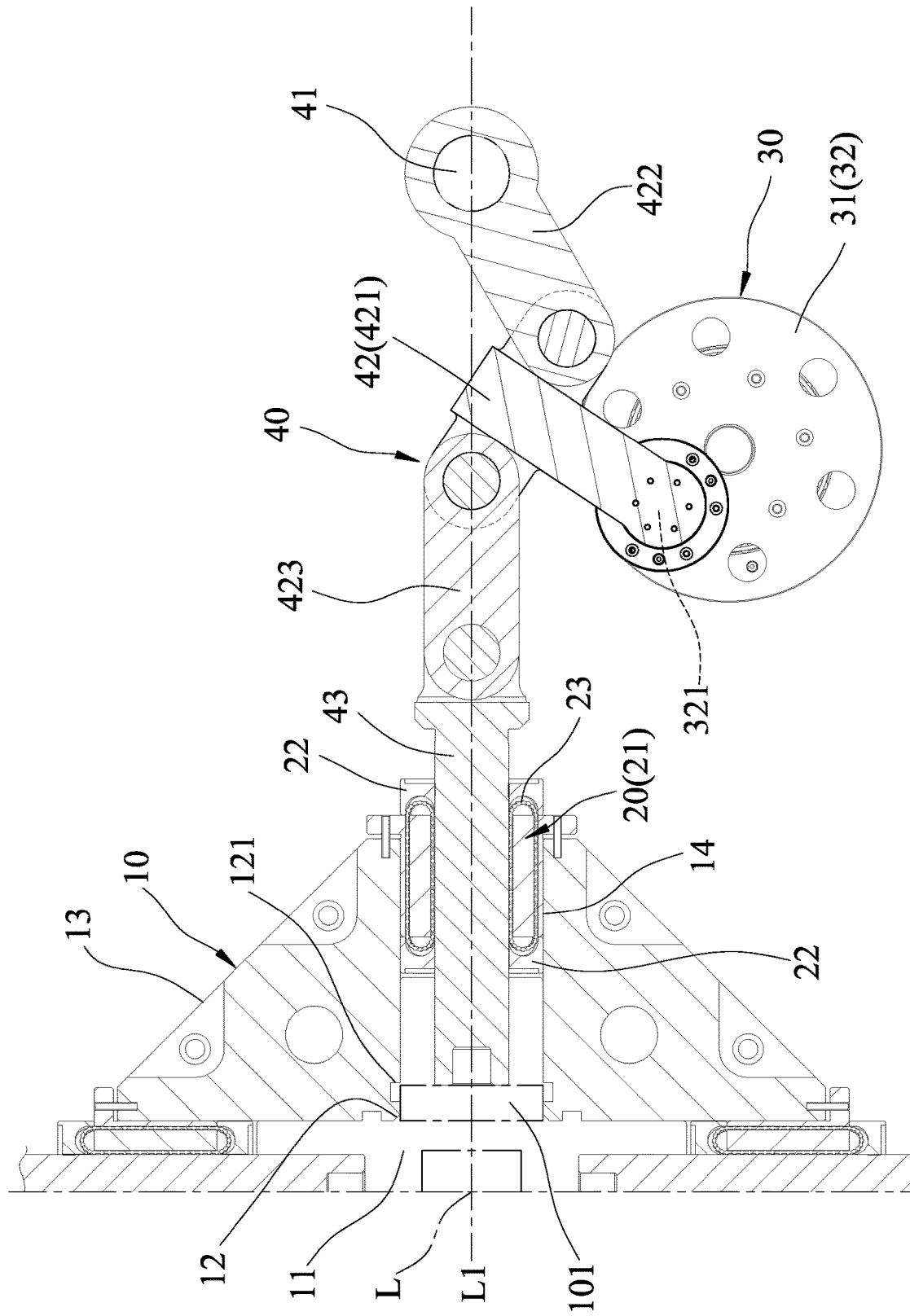
FIG. 5 is an enlarged sectional view of a portion of FIG. 4.

Referring to FIG. 5, in combination with FIGS. 1 and 3, each of the linear bearing units 20 is mounted in a respective one of the guide holes 14, and includes a main body 21, two sealing covers 22 disposed on two opposite ends of the main body 21 along the central line (L1), and a plurality of track roller units 23 disposed between the main body 21 and the sealing covers 22. The main body 21 has a central hole 211 extending along the central line (L1), and a plurality of equiangularly spaced-apart through grooves 212 spaced apart from and surrounding the central hole 211 and parallel to the central line (L1). The central hole 211 is defined by a hole-defining wall. The hole-defining wall of the central hole 211 is formed with a plurality of inward grooves 213 respectively corresponding to the through grooves 212. Each of the sealing covers 22 has an inner end surface 221 abutting against a respective one of the two opposite ends of the main body 21, and a plurality of angularly spaced-apart bearing grooves 222 formed in the inner end surface 221 and respectively communicating with the through grooves 212 and the inward grooves 213. Each of the track roller units 23 has one end, and the other end that passes through one of the through grooves 212, that loops around a groove wall of a corresponding one of the bearing grooves 222 of one of the sealing covers 22, that extends through a corresponding one of the inward grooves 213, that loops around a groove wall of a corresponding one of the bearing grooves 222 of the other sealing cover 22, and that is then connected to the one end thereof so as to form a closed loop.

The speed reduction drive units 30 are disposed spaced apart from the outer peripheral surface 13 of the guide seat 10, are positioned relative to the guide seat 10, and correspond respectively to the guide holes 14. Each speed reduction drive unit 30 includes a servo motor 31, and a speed reducer 32 driven by the servo motor 31. The speed reducer 32 of this embodiment utilizes a harmonic drive speed reducer, and has an eccentric shaft 321 disposed eccentrically and capable of outputting rotational force. The speed reducer 32 is not an important feature of this disclosure, so that the detailed structure and operating principle thereof will not be described herein.

Each of the mold locking units 40 is connected between one of the guide holes 14 and a corresponding speed reduction drive unit 30, and includes a pivot shaft 41 that is fixed relative to the guide seat 10 and that is located outwardly of the corresponding guide hole 14, a linkage 42 disposed between the pivot shaft 41 and the corresponding guide hole 14, and a guide rod 43 pivoted to the linkage 42. The linkage 42 includes a crank 421 connected to and driven by the eccentric shaft 321, a first link arm 422 pivoted between the crank 421 and the pivot shaft 41, and a second link arm 423 pivoted between the crank 421 and the guide rod 43.

The crank 421 of this embodiment has a T-shaped cross section including a first crank arm 4211 pivoted to the eccentric shaft 321, and a second crank arm 4212 connected to and transverse to the first crank arm 4211. The first link arm 422 has one end pivoted to the pivot shaft 41, while the other end pivoted to one end of the second crank arm 4212. The second link arm 423 has one end pivoted to the other end of the second crank arm 4212. The guide rod 43 of each mold locking unit 40 has a shank portion 430 extending through the central hole 211 of the main body 21 of a corresponding one of the linear bearing units 20 for connection with a respective one of the mold blocks 101, and a head portion 433 that is connected to one end of the shank portion 430, that is located outwardly of the main body 21 of the corresponding linear bearing unit 20, and that is pivoted to the other end of the second link arm 423. The shank portion 430 has an outer surface 431 formed with a plurality of circumferentially spaced-apart guide planes 432 corresponding respectively to the track roller units 23 and parallel to the central line (L1). When the linkage 42 of each mold locking unit 40 is driven by the corresponding speed reduction drive unit 30, it will in turn drive the guide rod 43 to move linearly along the central line (L1). In this embodiment, the pivot shafts 41 of the mold locking units 40 are fixed to the machine base 60 of the injection molding machine 1.

Figure 9:
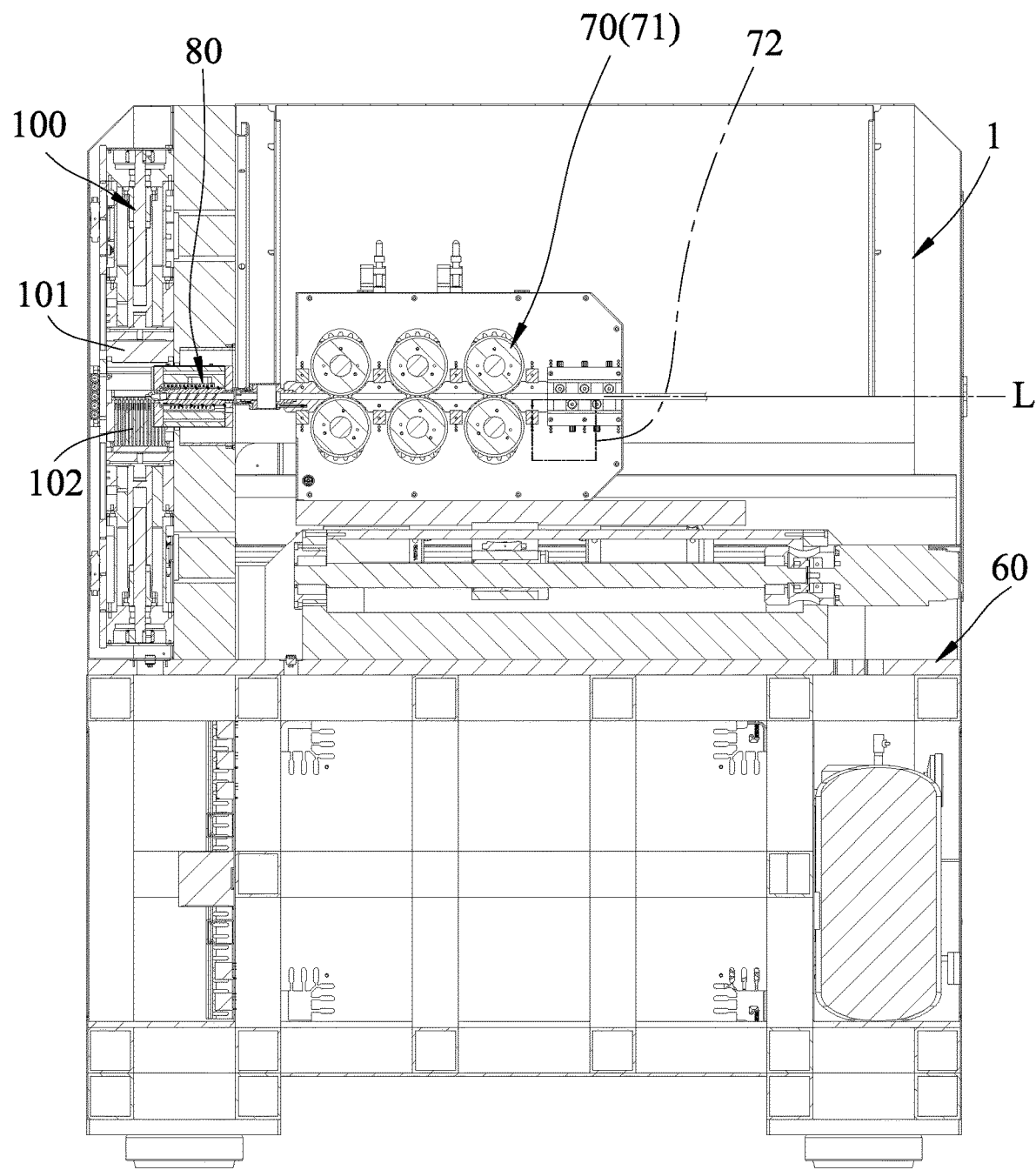
FIG. 9 is a sectional view of an injection molding machine including the multi-mold block drive device of the present disclosure.

Referring to FIG. 9, the feeding unit 70 of the injection molding machine 1 is disposed on the machine base 60, and includes a plurality of pull wheel assemblies 71 spaced apart from each other along the axis (L), and a motor 72 for driving the pull wheel assemblies 71 to rotate. Each pull wheel assembly 71 includes upper and lower pull wheels. The pull wheel assemblies 71 are used for pulling a solid linear material to move toward the material feed backflow prevention device 80. The linear material may be a glass or plastic linear material.

The material feed backflow prevention device 80 is disposed on a side of the feeding unit 70 to prevent backflow of the linear material during feeding. The material feed backflow prevention device 80 is not an important feature of this disclosure, so that the detailed structure and operating principle thereof will not be described herein.

The pair of molds 102 of this embodiment are disposed in opposite upper and lower ones of the mold grooves 121, and are located at a material discharge end of the material feed backflow prevention device 80 for receiving a flowable raw material extruded from the material feed backflow prevention device 80.

To further understand the effect produced, the technical means applied, and the expected effect of the coordination of the components of this disclosure, they will be described again below, and it is believed that a more in-depth and specific understanding of this disclosure can be obtained thereby.

Figure 6:
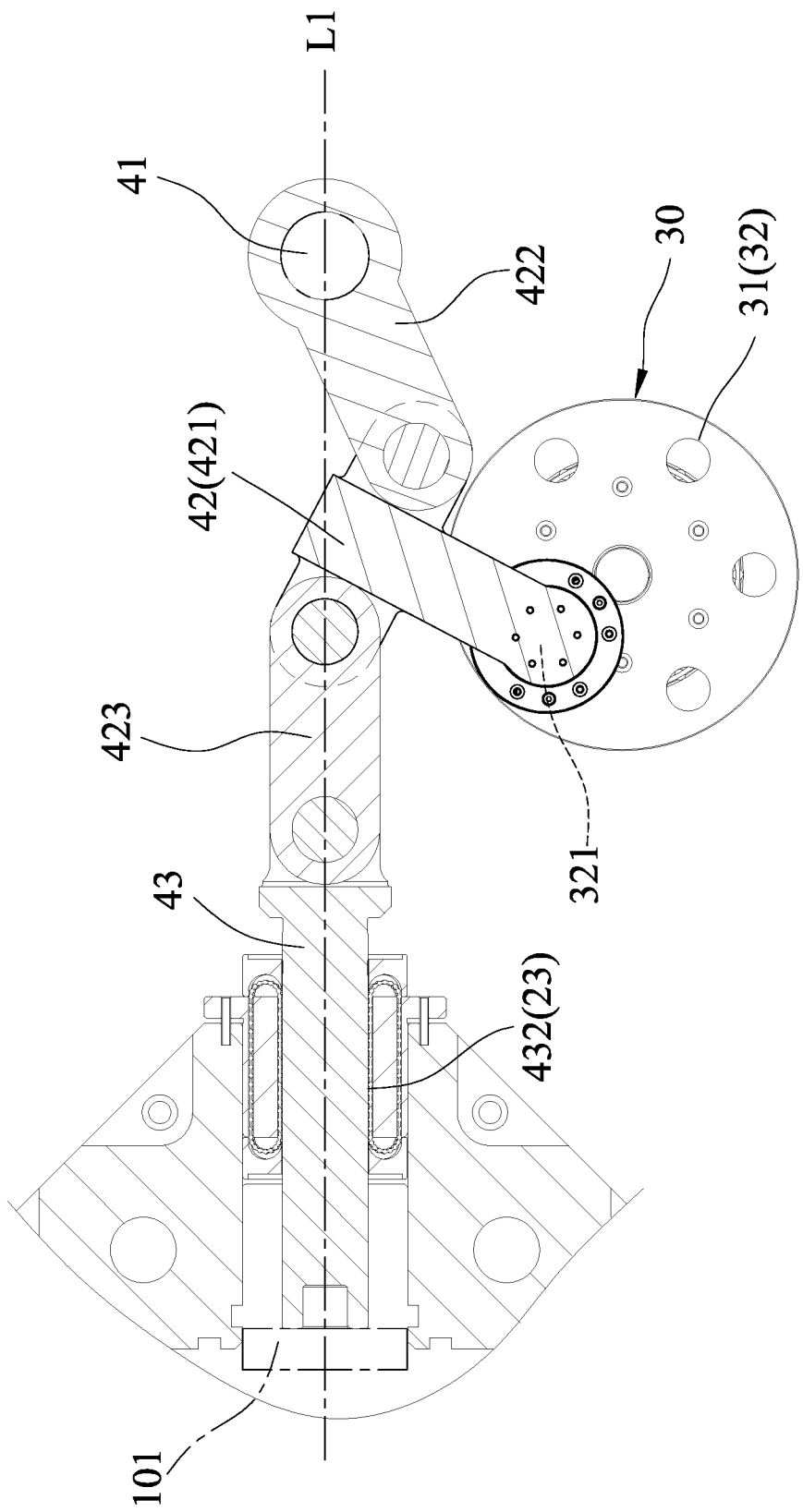
FIG. 6 is a view similar to FIG. 5, but illustrating how a guide rod can be driven to move linearly along a central line.
Figure 7:
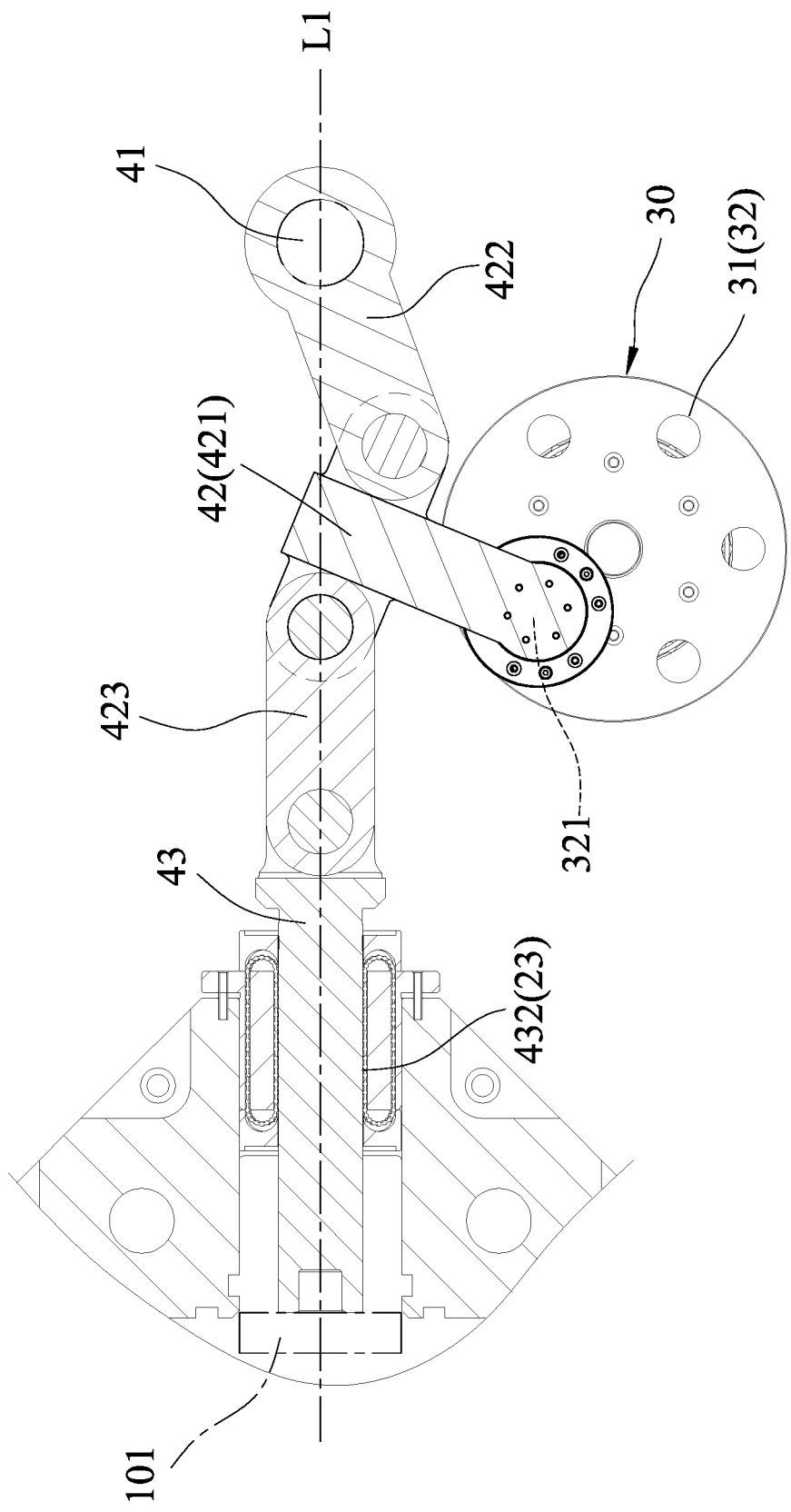
FIG. 7 is a view similar to FIG. 6, but illustrating the guide rod driving a mold block connected thereto.
Figure 8:
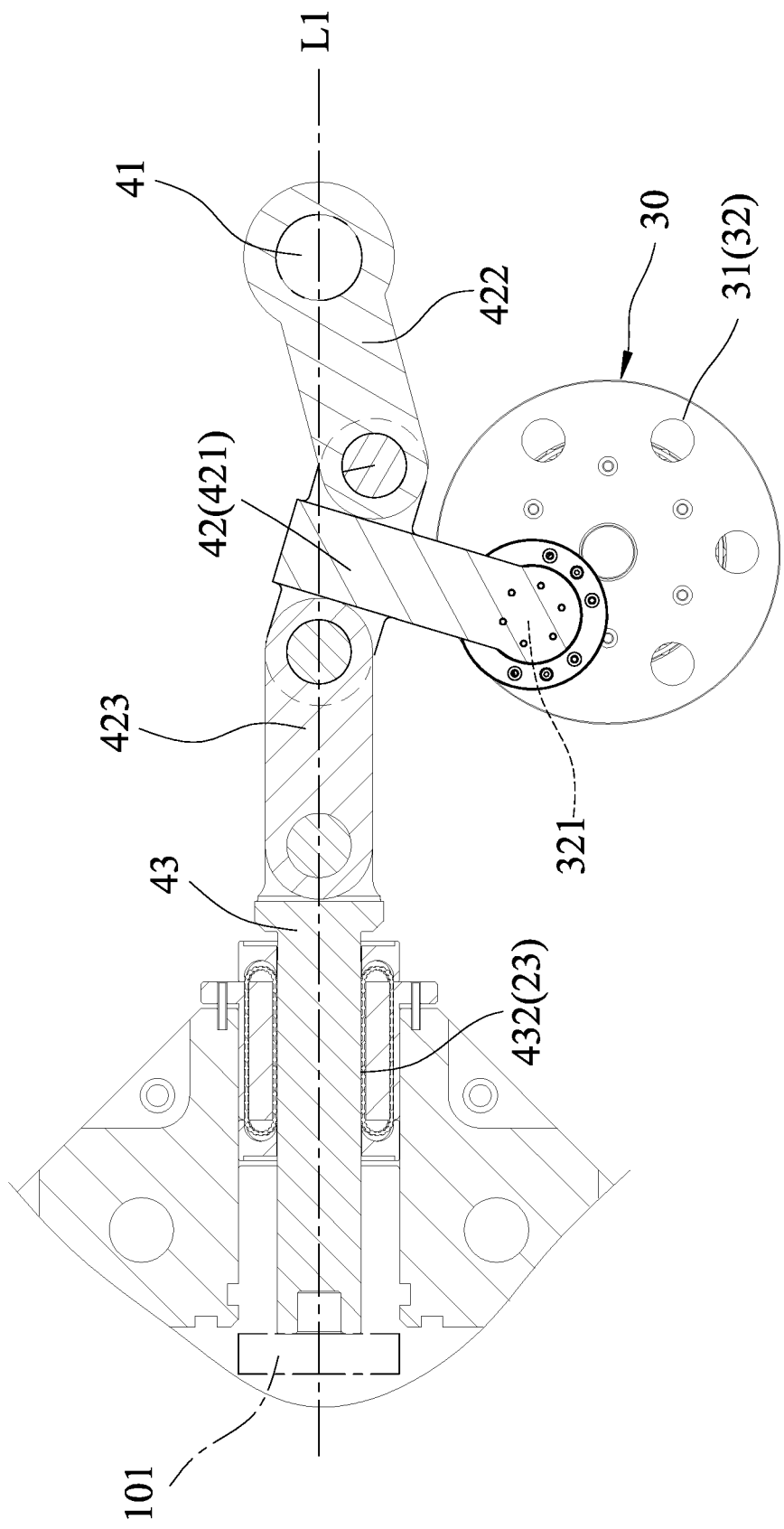
FIG. 8 is a view similar to FIG. 7, but with the mold block being further driven by the guide rod.

Referring to FIGS. 6 to 8, in combination with FIG. 9, to use the injection molding machine 1 for performing an injection molding operation, the servo motor 31 of each speed reduction drive unit 30 is first activated to drive the eccentric shaft 321 of the speed reducer 32 to eccentrically rotate about a shaft thereof. Rotation of the eccentric shaft 321 will, in turn, drive the crank 421 of the corresponding linkage 42 to rotate therealong, and the crank 421 then simultaneously drives the first link arm 422 to pivot about the pivot shaft 41 and the second link arm 423 to pivot relative to the guide rod 43 so as to pull the same, so that the guide rod 43 can be driven to move linearly along the central line (L1). As such, the guide rods 43 of the mold locking units 40 can drive the mold blocks 101 connected thereto to move toward each other to lock the molds 102 or away from each other to open the molds 102. That is, rotation of the servo motors 31 in a forward or reverse direction can drive the mold blocks 101 to lock or open the molds 102 through the guide rods 43.

During locking or opening of the molds 102, by using the speed reduction drive units 30 to drive the linkages 42 to rotate and pivot and to drive the guide rods 43 to move linearly along the central line (L1), the guide planes 432 on the outer surfaces 431 of the guide rods 43 are guided linearly by the track roller units 23 to maintain accurate linear movement of the guide rods 43. Further, a frictional force between the guide rod 43 and the mating component is low when the guide rod 43 moves linearly, so that noise can be reduced, and the service life of the guide rod 43 can be prolonged.

After the mold blocks 101 are driven by the multi-mold block drive device 100 to clamp and lock the molds 102, the solid linear material can be pulled and moved toward the material feed backflow prevention device 80 through the feeding unit 70, and is transformed into a flowable raw material through the material feed backflow prevention device 80. Finally, the flowable raw material is extruded out of the material feed backflow prevention device 80 into the molds 102 to complete the injection molding of optical lenses.

In summary, each of the multi-mold block drive device 100 and the injection molding machine 1 of the present disclosure has a simple overall structure, is easy to manufacture and assemble, and has a good locking effect for the molds 102. Therefore, the object of the present disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multi-mold block drive device comprising:
    a guide seat including an inner peripheral surface surrounding an axis and defining a mold hole, an outer peripheral surface opposite to said inner peripheral surface, and a plurality of spaced-apart guide holes surrounding said mold hole, each of said guide holes extending through said inner peripheral surface and said outer peripheral surface along a central line transverse to the axis and communicating with said mold hole;
    a plurality of speed reduction drive units that are disposed spaced apart from said outer peripheral surface, that are positioned relative to said guide seat, and that correspond respectively to said guide holes, each of said speed reduction drive units including a servo motor, and a speed reducer driven by said servo motor, said speed reducer having an eccentric shaft disposed eccentrically and capable of outputting rotational force; and
    a plurality of mold locking units each connected between one of said guide holes and a corresponding one of said speed reduction drive units, each of said mold locking units including a pivot shaft that is fixed relative to said guide seat and that is located outwardly of a corresponding one of said guide holes, a linkage disposed between said pivot shaft and the corresponding one of said guide holes, and a guide rod pivoted to said linkage, said linkage including a crank driven by said eccentric shaft, a first link arm pivoted between said crank and said pivot shaft, and a second link arm pivoted between said crank and said guide rod, wherein, when said linkage of each of said mold locking units is driven by the corresponding one of said speed reduction drive units, said linkage will in turn drive said guide rod to move linearly along the central line.

2. The multi-mold block drive device as claimed in claim 1, further comprising a plurality of linear bearing units, each of said linear bearing units being disposed between one of said guide holes and a corresponding one of said speed reduction drive units, and including a main body, two sealing covers disposed on two opposite ends of said main body along the central line, and a plurality of track roller units disposed between said main body and said sealing covers, said guide rod having an outer surface formed with a plurality of circumferentially spaced-apart guide planes corresponding respectively to said track roller units and parallel to the central line.

3. The multi-mold block drive device as claimed in claim 2, wherein said main body of each of said linear bearing units has a central hole extending along the central line, and a plurality of equiangularly spaced-apart through grooves spaced apart from and surrounding said central hole and parallel to the central line, said central hole being defined by a hole-defining wall, said hole-defining wall of said central hole being formed with a plurality of inward grooves respectively corresponding to said through grooves, each of said sealing covers having an inner end surface abutting against a respective one of said two opposite ends of said main body, and a plurality of angularly spaced-apart bearing grooves formed in said inner end surface and communicating with said through grooves and said inward grooves, each of said track roller units having one end, and the other end that passes through one of said through grooves, that loops around a groove wall of a corresponding one of said bearing grooves of one of said sealing covers, that extends through a corresponding one of said inward grooves, that loops around a groove wall of a corresponding one of said bearing grooves of the other one of said sealing covers, and that is then connected to said one end of a corresponding one of said track roller units so as to form a closed loop.

4. An injection molding machine, comprising:
a machine base;
a feeding unit mounted on said machine base for feeding a linear material, and including a plurality of pull wheel assemblies spaced apart from each other along an axis, and a motor for driving said pull wheel assemblies;
a material feed backflow prevention device mounted on said machine base and located on a side of said feeding unit for preventing backflow of the linear material during feeding;
a multi-mold block drive device mounted on said machine base and located at a material discharge end of said material feed backflow prevention device, said multi-mold block drive device being suitable for driving a plurality of mold blocks, and including a guide seat including an inner peripheral surface surrounding an axis and defining a mold hole, an outer peripheral surface opposite to said inner peripheral surface, a plurality of spaced-apart mold grooves formed in said inner peripheral surface and communicating with said mold hole, and a plurality of spaced-apart guide holes each of which extends through said outer peripheral surface along a central line transverse to the axis and communicates with a respective one of said mold grooves,
a plurality of speed reduction drive units that are disposed spaced apart from said outer peripheral surface, that are positioned relative to said guide seat, and that correspond respectively to said guide holes, each of said speed reduction drive units including a servo motor, and a speed reducer driven by said servo motor, said speed reducer including an eccentric shaft disposed eccentrically and capable of outputting rotational force, and
a plurality of mold locking units each connected between one of said guide holes and a corresponding one of said speed reduction drive units, each of said mold locking units including a pivot shaft that is fixed relative to said guide seat and that is located outwardly of a corresponding one of said guide holes, a linkage pivoted to said pivot shaft, and a guide rod pivoted to said linkage, said linkage including a crank driven by said eccentric shaft, a first link arm pivoted between said crank and said pivot shaft, and a second link arm pivoted between said crank and said guide rod, wherein, when said linkage of each of said mold locking units is driven by the corresponding one of said speed reduction drive units, said linkage will in turn drive said guide rod to move linearly along the central line; and
a pair of molds that are disposed in two opposite ones of said mold grooves, that are located at a material discharge end of said material feed backflow prevention device, and that are capable of receiving a flowable raw material extruded from said material discharge end, said pair of molds being configured to be clamped and locked by the mold blocks when the mold blocks are driven by said multi-mold block drive device to move toward each other.

\* \* \* \* \*